(12) United States Patent
Tsao

(10) Patent No.: US 6,302,542 B1
(45) Date of Patent: Oct. 16, 2001

(54) MOVING SCREEN PROJECTION TECHNIQUE FOR VOLUMETRIC THREE-DIMENSIONAL DISPLAY

(76) Inventor: Che-Chih Tsao, 16 Walnut St. #43, Arlington, MA (US) 02476-6154

( * ) Notice: Subject to any disclaimer, the term of this patent is extended or adjusted under 35 U.S.C. 154(b) by 0 days.

(21) Appl. No.: 09/253,656

(22) Filed: Feb. 20, 1999

Related U.S. Application Data

(63) Continuation-in-part of application No. 08/702,047, filed on Aug. 23, 1996, now Pat. No. 5,954,414.

(51) Int. Cl.[7] .................................................. G03B 21/28
(52) U.S. Cl. ............................... 353/7; 353/98; 359/478; 359/479
(58) Field of Search .................... 353/87, 46, 50, 353/51; 359/446, 458, 478, 479, 462, 471, 476, 477; 348/51, 44

(56) References Cited

U.S. PATENT DOCUMENTS

| | | | |
|---|---|---|---|
| 3,462,213 | 8/1969 | DeMontebello | 352/86 |
| 4,670,744 | 6/1987 | Buzak | 340/716 |
| 4,881,068 | 11/1989 | Korevaar et al. | 340/766 |
| 4,922,336 | 5/1990 | Morton | 358/88 |
| 5,082,350 | * 1/1992 | Garcia et al. | 359/478 |
| 5,148,310 | * 9/1992 | Batchko | 359/479 |
| 5,394,202 | * 2/1995 | Deering | 353/7 |
| 5,506,597 | 4/1996 | Thompson et al. | 345/85 |
| 5,537,251 | * 7/1996 | Shimada | 359/462 |
| 5,678,910 | * 10/1997 | Martin | 353/7 |
| 5,764,317 | 6/1998 | Sadovnik et al. | 349/5 |
| 5,954,414 | * 9/1999 | Tsao | 353/7 |

OTHER PUBLICATIONS

Buzak, T.S. "A Field–sequential Discrete–depth–plane Three–dimensional Display", SID International Symposium, vol. 16, pp. 345, 1985.

Downing, E. et al. "A Three–Color, Solid–State, Three–dimensional Display", Science vol. 273, Aug. 30, 1996, pp. 1185.

Hattori, T. et al. 1992 "Spatial Modulation Display using Spatial Light Modulators", Optical Engineering, vol. 31, No. 2 p. 350.

Paek, E.G. et al. "A 3D Projection Display using PDLCs", presented at the Conference of the International Society for Optical Engineering, Jan. 29–Feb. 2, 1996, San Jose, CA.

Rawson, E.G. "Vibrating Varifocal Mirrors for 3–D Imaging", IEEE Spectrum, Sep. 1969, pp. 37.

* cited by examiner

*Primary Examiner*—William Dowling

(57) ABSTRACT

This invention relates generally to improved approaches for displaying volumetric three-dimensional (3D) images. The basic idea features improved optical-mechanical mechanisms enabling creation of volumetric 3D images by successive projection of whole frames of 2D images, through an optical-mechanical image delivery system, onto a display plane that moves periodically and sweeps a space. In the rotating approach, two image delivery mechanisms can be used: a revolving multi-mirror system and a revolving orthogonal switchable reflector system. In the reciprocating approach, the image delivery mechanisms include a reciprocating reflector system and a zooming optics.

31 Claims, 8 Drawing Sheets

MOVING SCREEN PROJECTION TECHNIQUE FOR VOLUMETRIC THREE-DIMENSIONAL DISPLAY

This current invention is a continuation-in-part of Ser. No. 08/702,047 filed Aug. 23, 1996, which was issued as U.S. Pat. No. 5,954,414 of Sep. 21, 1999,now U.S. Pat. No. 5,954,414. This current invention is related to U.S. Pat. No. 5,754,147, granted May, 19, 1998; also related to U.S. patent application Ser. No. 09/218,938 filed Dec. 22, 1998.

BACKGROUND OF THE INVENTION

The parent invention of this current invention discloses a volumetric 3D display system that creates volumetric 3D images by projecting whole frames of 2D images created on a stationary projection device, through an optical-mechanical image delivery system, onto a moving screen (rotating or reciprocating). The system allows creation of volumetric 3D images using conventional 2D projection optics, without the need of collimated image beams. This current invention provides new mechanisms with improved motion smoothness and simplified structure.

In the prior arts, De Montebello disclosed a system using a rotating spiral screen to create a display space and a film projector to project 2D image frames onto the spiral screen [De Montebello 1969]. The depth of its display space is limited by the depth of focus of the projector and therefore is small. Morton described another system using a rotating helical screen to form a display space and using an anamorphic lens to accommodate the variation of focal distance from an image source to the surface of the helical screen [Morton 1990]. The anamorphic lens is difficult to make and complex to assemble. Its discrete nature can also compromise image quality. Another approach projects images composed of collimated light beams directly to a moving screen [Thompson 1996]. This usually requires a laser as the light source and hence can cost more than a projector-based system. Still another approach uses a stack of electrically switchable liquid crystal display layers [Hattori 1992, Sadovinik 1998]. Another approach uses a piezoelectric-based fast focusing lens to project image frames to a stack of switchable PDLC screens [Paek 1996]. Both approaches have limited resolution because the number of LCD panels or screens in the stack is physically limited.

SUMMARY OF THE INVENTION

This invention presents approaches with improved motion smoothness and simplified structure for volumetric 3D display by the Moving Screen Projection technique. A volumetric 3D display based on the Moving Screen Projection technique features three major portions:

(1) The moving screen: The periodically moving screen forms the display space and displays the projected images. Basically, there are two ways to sweep the screen over a space. The screen can be rotated or the screen can be reciprocated. For simplicity, these two approaches are termed as the Rotating Approach and the Reciprocating Approach respectively.

(2) The image delivery mechanism: The image delivery mechanism relays the optical image projected from the image projector onto the moving screen for displaying. The mechanism keeps the size and focus of the projected image frame invariant as the screen moves, and also keeps the orientation of the projected image frame synchronous to the moving screen. (Because direct whole-frame projection from the projector onto the screen is not possible due to the constant motion of the screen.) In the Rotating Approach, two improved mechanisms can be used. The first mechanism comprises a multi-mirror replay reflector rotating at half the speed of the rotating screen and a system of second relay reflectors rotating in synchronization with the screen, both with proper positioning with respect to the screen's angular position. The second mechanism comprises two switchable reflectors arranged at 90 degree, which also rotates at half the speed of the rotating screen and is properly positioned with respect to the screen's angular position. Each of the switchable reflectors can be switched to become reflective or transmissive. In the Reciprocating Approach, two types of improved mechanisms can be used. The first is the reciprocating reflector mechanism. A reflector system moving synchronously with the reciprocating screen but at a speed half of the screen speed is placed into the projection path between the image projector and the moving screen. This speed difference keeps the distance between the mirrored image of the projector, as viewed through the reciprocating reflector system, and the moving screen constant. The second mechanism is the zooming optics mechanism, which is capable of changing both the focus and the magnification of the projected 2D images in response to the reciprocating motion of the screen. The zooming optics can deliver the projected 2D images onto the moving screen in focus. It can also maintain or adjust the size of the projected image frames to create desired shape of display space.

(3) The image projector: The image projector generates and projects the set of 2D image frames, through the image delivery mechanism, onto the moving screen. The image projector generally consists of a image generating panel, a projection lens, and a light source.

BRIEF DESCRIPTION OF THE DRAWINGS

The invention can be described in details with the help of the following drawings:

FIG. 9b illustrates major ray traces of the embodiment of FIG. 9a.

DESCRIPTION OF THE INVENTION

Figure 1:
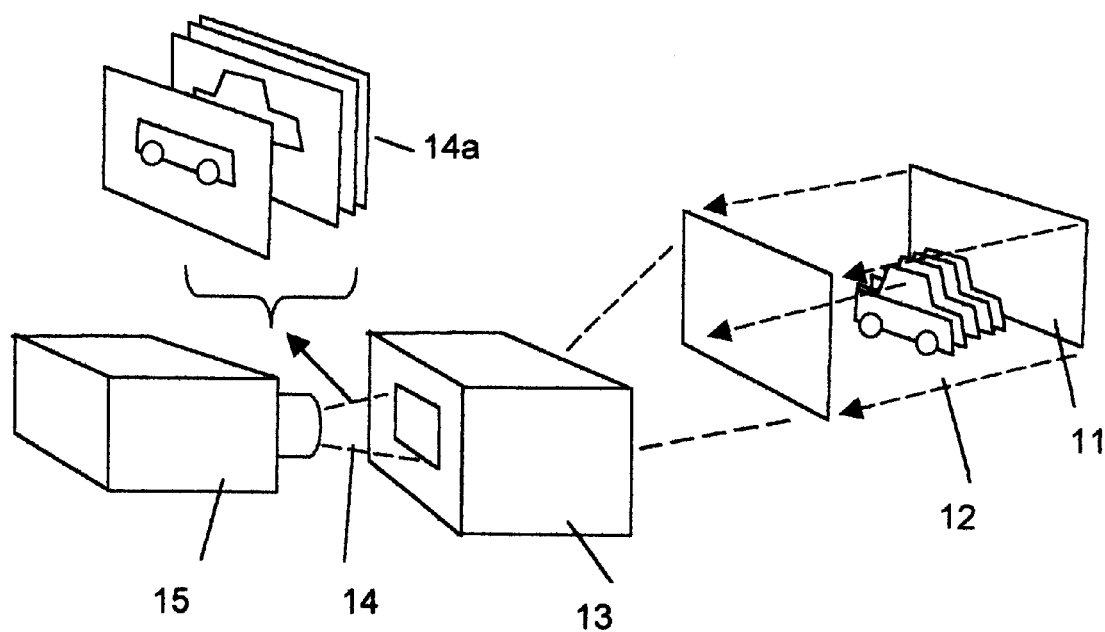
FIG. 1 illustrates the basic concept of the Moving Screen Projection technique.

FIG. 1 illustrates the basic concept of the Moving Screen Projection technique, which consists of three major portions:

(1) The moving screen: The periodically moving screen 11 displays the projected images and forms the display space 12.

(2) The image delivery mechanism: The image delivery mechanism 13 relays the projection beam 14, which contains a set of 2D image frames 14a, projected from the image projector onto the moving screen for displaying. The mechanism keeps the size and focus of the projected image invariant as the screen moves, and also keeps the orientation of the projected image frame synchronous to the moving screen. (Because direct whole-frame projection from the projector onto the screen is not possible due to the constant motion of the screen.)

(3) The image projector: The image projector 15 generates and projects the set of 2D image frames 14a, through the image delivery mechanism 13, onto the moving screen 11. The image projector generally consists of an image generating panel, a projection lens, and a light source.

By sweeping the screen across the space periodically and rapidly, and sequentially project onto the screen a series of 2D image frames, e.g. the profiles of an auto-body 14a in FIG. 1, the set of 2D image frames can thereby be distributed and displayed over the display space, with each frame located at a specific position in the space. This set of 2D image frames, when viewed from outside the display space, forms a 3D volumetric image, because of the after-image effect (persistence of vision) of human eyes. The image actually occupies space and can he viewed from different angles by many viewers simultaneously without the need of any glasses.

Basically, there are two ways to sweep the screen over a space. The screen can be rotated to form a cylinder-shaped display space; or the screen can be reciprocated to form a box-shaped display space. For simplicity, these two approaches are termed as the Rotating Approach and the Reciprocating Approach respectively.

Figure 2A:
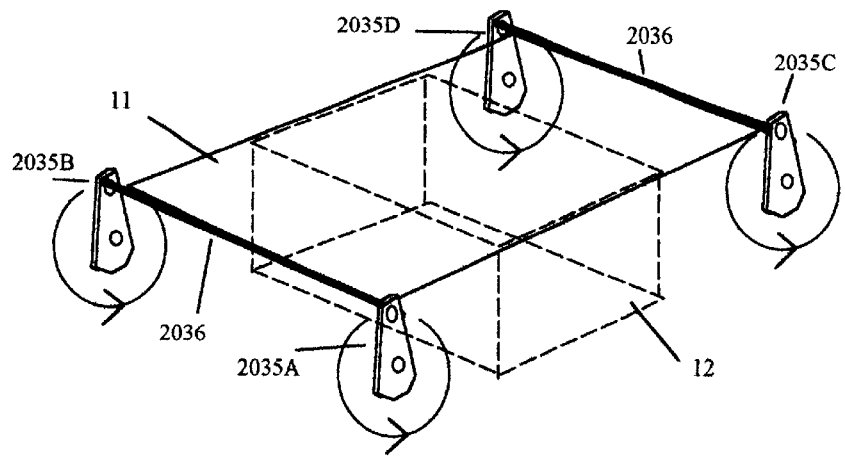
FIGS. 2a–2c illustrate various exemplary embodiments of reciprocating screen mechanism.

The Reciprocating Approach also includes oscillating sweeping as well as unidirectional sweeping by the whole screen or by a part of the screen surface. FIG. 2a illustrates a preferred reciprocating screen system that uses a smooth rotational mechanism to create an oscillating screen motion. The core mechanism has two pairs of rotary arms 2035A–D rotating in unison. The rotary arms can be mounted on an integrated machine base (not shown) and powered by a motor with a timing belt system (not shown). A translucent screen 11 is attached at its both ends to two rods 2036, which are mounted to the two pairs of rotary arms with rotary bearings. As the arms rotates, the screen moves accordingly and a display space 12 can be created by the screen sweeping. Because the four rotary arms rotate in unison, there is basically no stress imposed upon the screen and rod assembly during the rotation. The screen and the rods can therefore be made of lightweight materials. Each rotary arm can be balanced with a proper weight distribution. As a result, the rotation can be smooth and well balanced. This mechanism was previously described in the related U.S. patent application Ser. No. 09/218,938 filed Dec. 22, 1998.

Figure 2B:
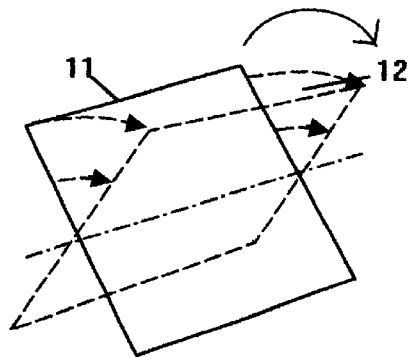
Figure 2C:
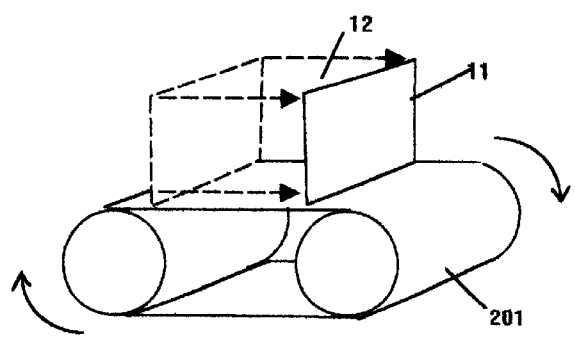

FIG. 2b shows an exemplary reciprocating screen with unidirectional sweeping, which is obtained by using a portion of a rotating screen 11. FIG. 2c illustrates still another unidirectional sweeping screen, which is a screen surface 11 attached to a rotating endless belt system 201. Other examples of reciprocating screen mechanisms with unidirectional sweeping include a rotating helical screen, as the screen described in [Morton 1990], and a rotating spiral screen, as described in [De Montebello 1969]. The screen can be made of a translucent material so that the projected images can be visible from both sides of the screen.

Figure 3A:
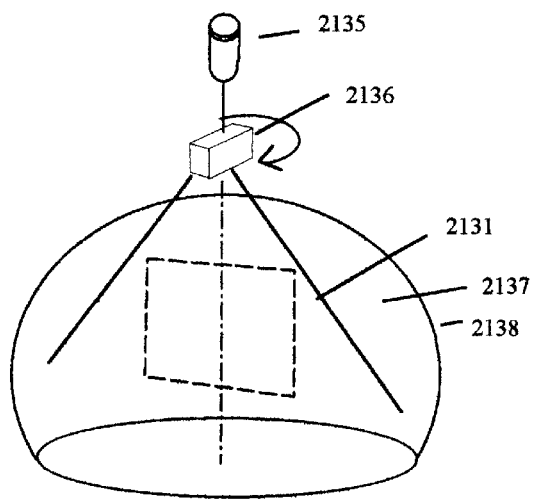
FIGS. 3a–3b illustrate exemplary embodiments of moving screen mechanism based on the 2-stage excitation principle.
Figure 3B:
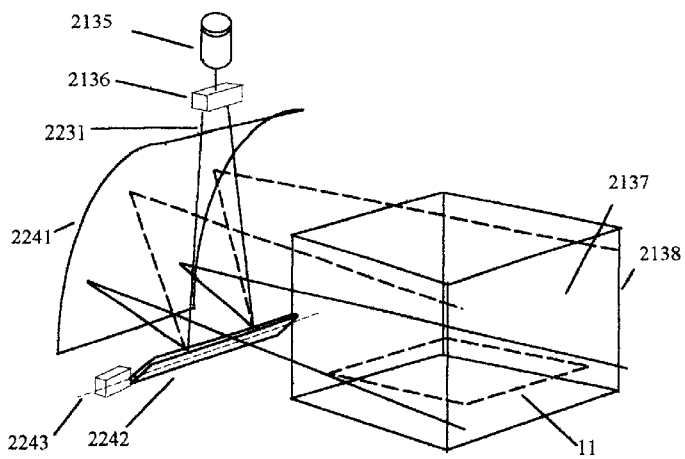

The screen can also be in the form of a planar light beam intersecting a volume of a photoluminescent material, if the 2-stage excitation principle is used for the volumetric display. The basic concept is to replace the physical screen with a planar light beam (the first stage excitation) in a photoluminescent material and project a whole frame of image (the second stage excitation) to the planar light beam. FIG. 3a illustrates a rotating planar light beam. A planar beam 2131 is created by a laser 2135 of a first frequency and a planar beam converter 2136, which can either be a set of cylindrical lens or diffractive optics. By rotating the planar beam converter, the planar beam sweeps the photoluminescent material 2137 enclosed in a container 2138. FIG. 3b illustrates a reciprocating planar beam. A planar beam 2231 is again created by a laser and a planar beam converter. There can be many ways to create parallel scan planes 11 in the container of photoluminescent material. One example is using a parabolic reflector 2241 and a scanning mirror 2242 moving about its focal line 2243, as shown in figure. The physics of the 2-stage excitation principle can be found, for example, in [Korevaar 1989] and in [Downing 1996]. The mechanisms of FIG. 3a and FIG. 3b was previously described in the related U.S. patent application Ser. No. 09/218,938 filed Dec. 22, 1998.

Figure 4A:
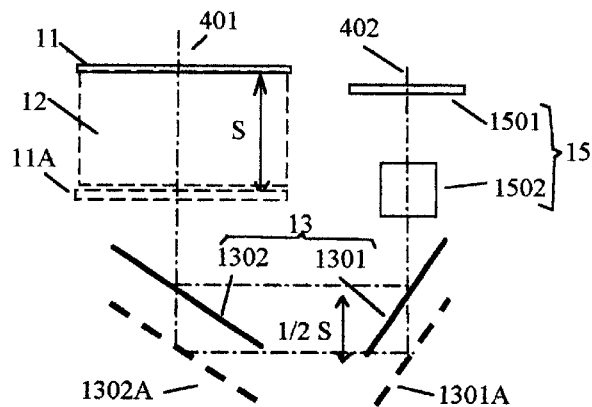
FIGS. 4a–4d illustrate the principle of the reciprocating reflectors mechanism and exemplary variations.

In the Reciprocating Approach, two improved image delivery mechanisms can be used. The first mechanism is the reciprocating reflector mechanism. A reflector system moving synchronously with the reciprocating screen but at a speed half of the screen speed is placed into the projection path between the image projector and the moving screen. This speed difference keeps the distance between the mirrored image of the projector, as viewed through the reciprocating reflector system, and the moving screen constant. FIG. 4a illustrates this idea with a reciprocating reflector system comprising a pair of reflectors. 2D image frames are created on the display panel 1501 and projected by the lens 1502 through the reflector-pair 13 onto the screen 11 (the light source of the projector 15 is omitted in the figure.). The display panel and the lens are stationary. The preferred angle between the two reflectors 1301 and 1302 is 90 degree. The projection path 402 is preferably parallel to the screen motion path 401. The screen reciprocates between position 11 and 11A to form a display space 12. As the screen 11 moves, the reflector-pair 13 moves in the same direction as the screen but at a speed half of the screen speed. As a result, the projecting distance from the display panel to the screen is always kept constant. Therefore, focus and magnification of the projected image can always be maintained. The mechanism of FIG. 4a has been disclosed in the parent invention, now U.S. Pat. No. 5,954,414 of Sep. 21, 1999.

Figure 4B:
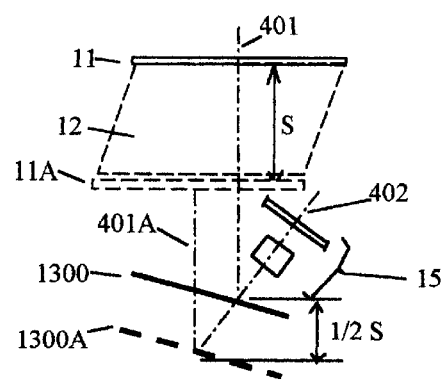
Figure 4C:
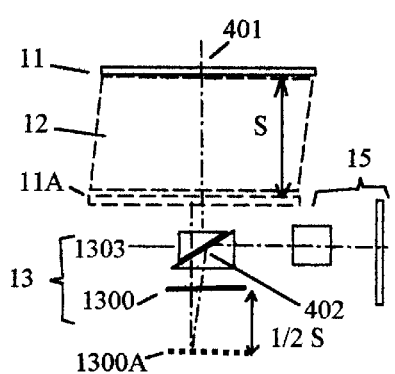
Figure 4D:
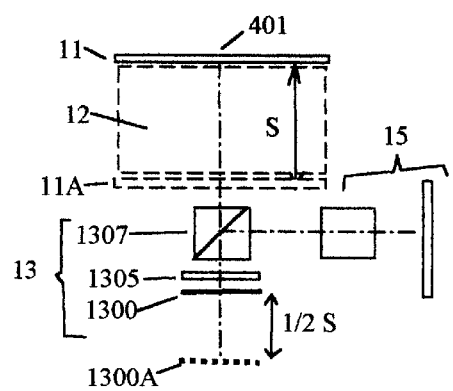
Figures 5A, 5B:
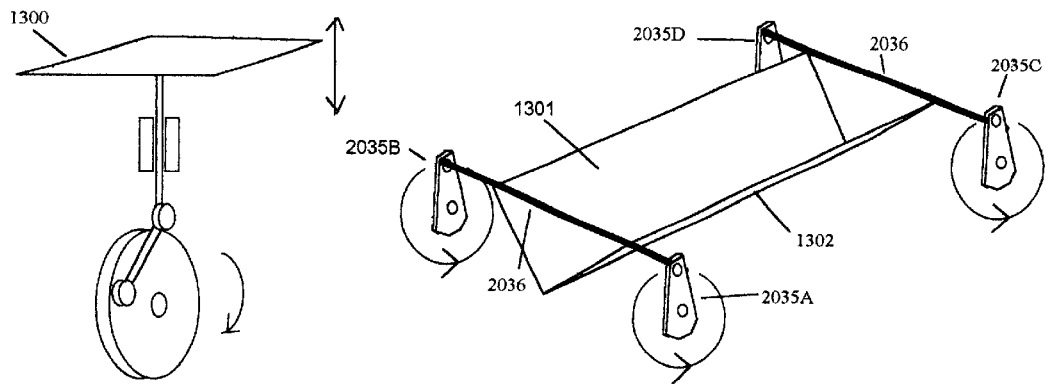
FIGS. 5a–5e illustrate exemplary embodiments of the reciprocating reflectors mechanism.
Figures 5C, 5D:
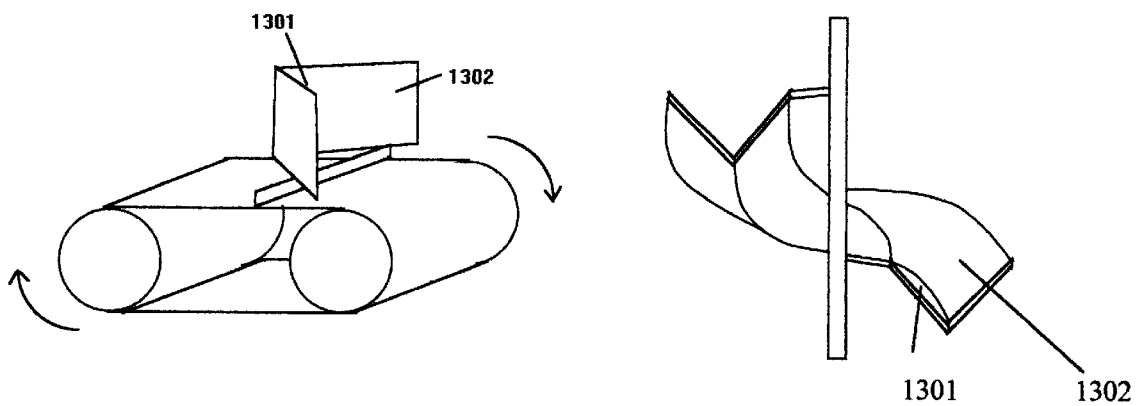
Figure 5E:
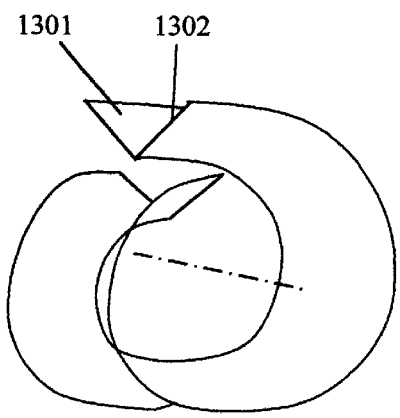

The reciprocating reflector can also be a single flat reflector, as shown in FIG. 4b. In this case, the projection path 402 must strike the reflector 1300 at an angle smaller than 90 degree. The resulted display space 12 has rhomboidal sides. Alternatively, a TIR (total internal reflection) prism 1303 can be included to reduce the angle between the incident projection path and the reflected path, as illustrated in FIG. 4c. When the projection beam is polarized, e.g. when a LCD (liquid crystal display) panel is used as the image panel, a polarizing beam splitter 1307 can be applied in a setup as shown in FIG. 4d to bring the incident beam to the reflector and the reflected beam out of the reflector into the same path 401. A quarter wave retarder 1305 is required between the polarizing beam splitter and the reflector 1300. The polarization axis of the projection beam leaving the projector 15 is arranged so that the beam is reflected toward the quarter wave retarder 1305 and the reflector 1300 by the polarizing beam splitter. The quarter wave retarder is oriented so that the polarization axis of the projection beam is rotated 90 degree after being reflected back by the reflector and passing through the quarter wave retarder plate again. The reflected beam can therefore pass the polarizing beam splitter and reach the screen 11. The resulted display space 12 has rectangular sides. The reciprocating motion of the reflector system can be achieved by using a slider-crankshaft-wheel mechanism, as shown in FIG. 5a. Alternatively, the same mechanisms used for creating screen motion can also be used to generate the motion of the reflector system. For example, the reflector pair 1301 and 1302 can be attached to a system of rotating arms as shown in FIG. 5b, which is a mechanism similar to the one in FIG. 2a. For another example, the reflector pair can also be mounted to a rotating belt system as shown in FIG. 5c, which is a mechanism similar to the one in FIG. 2c. Similarly, mechanisms such as rotating spiral wheel and rotating helical surface can also be used for reciprocating reflector systems, as shown in FIG. 5d and 5e. In examples depicted in FIG. 5b–5d, the reflector pair structure 1301 and 1302 can also be replaced by a single surface reflector. Of course, there can be other mechanisms to create the reciprocating motion of the reflector system. The speed ratio between the screen and the reflector system can be maintained by using two motors controlled by a micro-computer, or by using mechanical means such as timing belts and gears.

Figure 6:
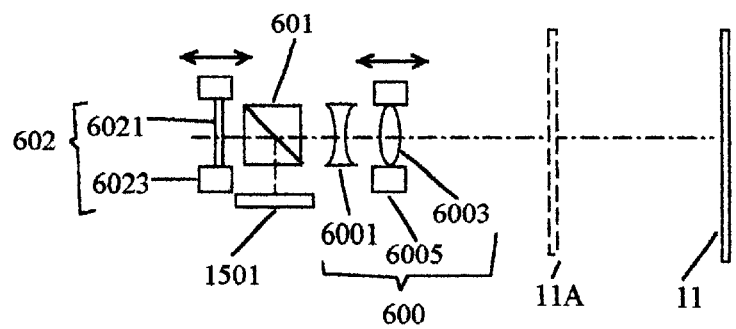
FIG. 6 illustrates an exemplary embodiment of the zooming optics mechanism based moving optical elements.

The second mechanism is the zooming optics mechanism, which is capable of changing both the focus and the magnification of the projected 2D images in response to the reciprocating motion of the screen. The zooming optics can deliver the projected 2D images onto the moving screen in focus. It can also maintain or adjust the size of the projected image frames to create desired shape of display space. In general, the zooming optics is integrated with the image projector system. This zooming function can be achieved by at least three methods:

(1) Zooming by changing distance between optical elements in synchronization with screen motion: In general, at least two optical elements are needed for zooming function. By changing the distance between the image panel (image source) and the projection optics and changing the distances among the optical elements in the projection optics, both the focus and the magnification of the projected 2D images can be varied to match the constantly moving screen. In the parent invention (now U.S. Pat. No. 5,954,414) of this current application, an example of moving zoom lens is disclosed. In addition to lens, there are other optical elements that can be used for projection optics. For example, a concave mirror can also be used as a real image projector. The relative motion among the optical elements can be achieved by using precision linear stages driven by servo-motors and controlled by a microcomputer. Alternatively, cam wheels or piezoelectric-actuators can also be used to move the optical elements. In cases when direct moving of optical components is not desirable, a moving reflector can be introduced into the optical path to move the reflected image of the component, instead of the component itself. FIG. 6 illustrates an exemplary embodiment based on zooming optics by moving elements. The image from the image panel 1501 is first reflected by a TIR prism 601 to the moving reflector system 602, which reflects the image to the projection lens system 600. In the moving reflector system, a piezoelectric-actuator 6023 drives the reflector 6021 so that the effective optical path from the image panel 1501 to the projection lens 600 can be changed. In the projection lens system, the first lens 6001 is fixed but the second lens 6003 is again driven by a piezoelectric-actuator so that the distance between the two elements can be changed.

Figure 7A:
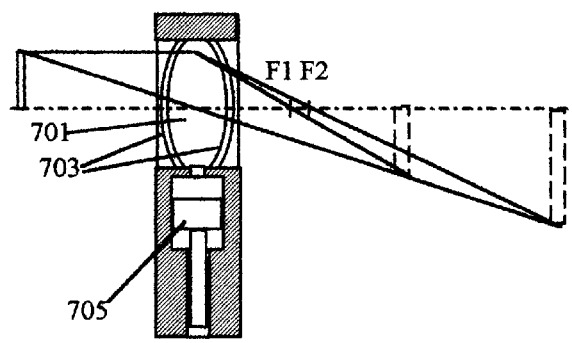
FIGS. 7a–7b illustrates exemplary embodiments of deformable lens and concave mirror and ray traces illustrating their optical function.
Figure 7B:
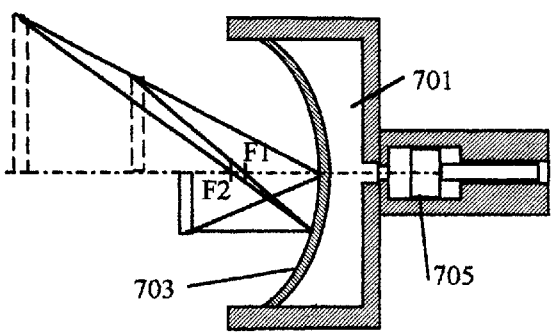
Figure 7C:
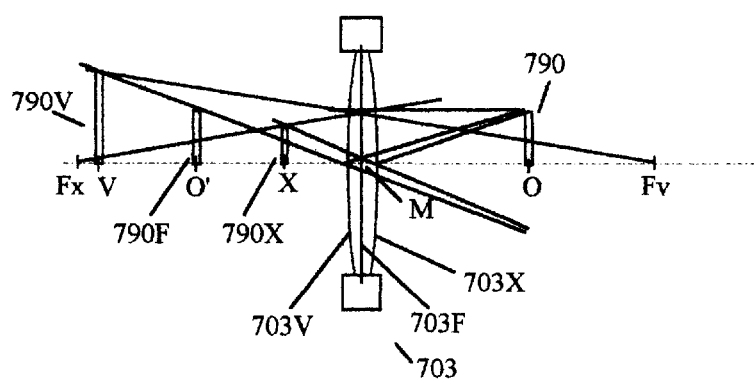
FIG. 7c illustrates the optical function of a varifocal mirror by ray traces.
Figure 8A:
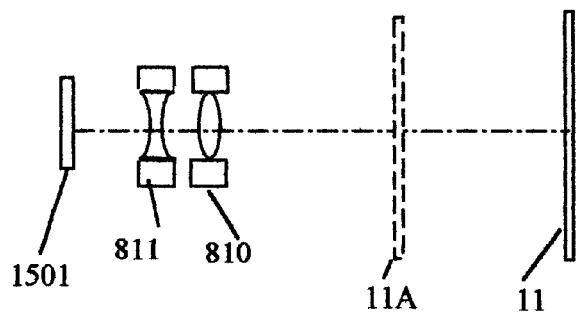
FIG. 8a illustrates an exemplary embodiment of the zooming optics mechanism based on deformable projection lens.
Figure 8B:
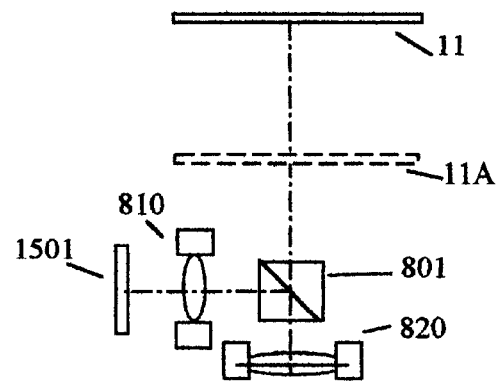
FIG. 8b illustrates an exemplary embodiment of the zooming optics mechanism based on a combination of deformable lens and a varifocal mirror.

(2) Zooming by changing the power of the optical elements in synchronization with screen motion: Again, at least two optical elements are needed for zooming function. By changing the power of each optical element, both the focus and the magnification of the projected 2D images can be varied to match the constantly moving screen. Changing the power of a single optical element changes its focal length. Such a variable-power element is therefore called vari-focal optical element. There can be at least three types of varifocal optical elements. The first type is the deformable lens. A deformable lens can be made of an elastic solid. An actuator induces the change of its curvature and therefore the change of its focal length. Alternatively, as illustrated in FIG. 7a, a deformable lens can also be made by filling a gas or a liquid 701 between two thin transparent materials with a preformed shape 703. Change of pressure by a pressure actuator 705 changes the curvature of the lens. Both converging and diverging lens can be made deformable using the above techniques. The second type is the deformable concave mirror. Again, a deformable concave mirror can be made from an elastic solid. An actuator induces the change of its curvature and therefore the change of its focal length. A deformable concave mirror can also be made by filling a gas or a liquid 701 to the back of a thin concave reflective surface with a preformed shape 703. Change of pressure by a pressure actuator 705 changes the curvature of the concave reflector. The third type is the varifocal mirror. A varifocal mirror comprises a thin reflective membrane capable of changing its curvature in response to the driving signal, usually the acoustical pressure, to become a flat mirror, a concave mirror, or a convex mirror. Details on the mechanical construction of the varifocal mirror can be found in [Rawson 1969]. FIG. 7c illustrates the principle of varifocal mirror by ray traces. When the reflective surface is flat 703F, the mirror image 790F of the object 790 forms at an image distance O'M=OM. When the reflective surface deforms and becomes a convex mirror 703X, the mirror image of the object 790 becomes smaller and closer to the mirror 790X. The focal length MFx, corresponding to convex mirror 703X, becomes smaller as the mirror curvature increases. When the reflective surface becomes a concave mirror 703V, the mirror image of the object becomes larger and further from the mirror 790V. Again, the focal length of the concave mirror MFv decreases as the mirror curvature increases. From FIG. 7c, one can see that a vibrating varifocal mirror can not only change the location of the image but also change the image size. The image size and the image location are correlated and are determined by object distance (OM) and the focal length of the varifocal mirror. The varifocal mirror differs from the first and the second type varifocal elements in that the varifocal mirror is mainly used for forming virtual images, while the first and second type elements are used for forming real images. Therefore, a varifocal projection optics must contain at least one element of the first or the second type optics. FIG. 8a illustrates an exemplary embodiment based on zooming optics by deformable projection lens. The projection lens, comprising two deformable lens 811 (diverging lens) and 810 (converging lens), projects the images displayed on the image panel 1501 onto the moving screen 11. As the screen reciprocates, the focus and the magnification of the projected images can be maintained constant by actuating the two deformable lens respectively to change their optical powers, according to the screen location. FIG. 8b illustrates another exemplary embodiment based on zooming optics. The system comprises one deformable projection lens 810 and one varifocal mirror 820. A TIR prism 801 directs the projection beam from the projection lens to the varifocal mirror and then sends the reflection beam from the varifocal mirror to the screen.

Figure 8C:
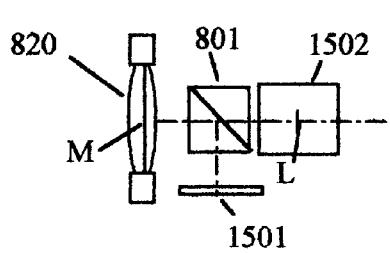
FIG. 8c illustrates an exemplary embodiment of the zooming optics mechanism based on a varifocal mirror and a fixed projection lens.
Figure 8D:
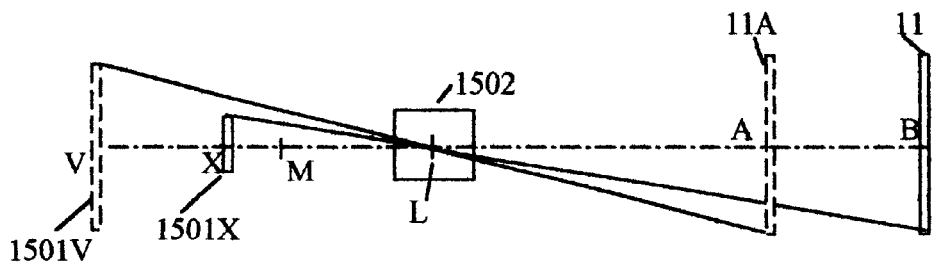
FIG. 8d illustrates major ray traces of the embodiment of FIG. 8c.

Although two varifocal elements are needed in general to maintain both the focus and the magnification of the projected image on the moving screen, a specially arranged setup using only one varifocal mirror can still give constant focus and magnification. FIG. 8c illustrates the preferred embodiment. The varifocal mirror 820 is placed in the optical path between the image panel 1501 and the projection lens 1502, which is a regular projection lens. A TIR prism 801 is again used with the varifocal mirror. By such a placement, the varifocal mirror can therefore, as it vibrates, change both the effective image distance (from the image panel to the projection lens) and the effective size of the image panel in a correlated fashion. FIG. 8d illustrates the positions and the sizes of the virtual images of the panel as imaged by the varifocal mirror in the setup of FIG. 8c. When the varifocal mirror becomes a convex mirror, the panel image 1501X appears closer to the projection lens than the actual panel does. When the varifocal mirror becomes a concave mirror, the panel image 1501V appears further to the projection lens. With a regular projection lens 1502, the object (panel image) 1501X with shorter object distance XL is projected to a longer image distance LB; and the object 1501V of longer object distance VL can be projected to a shorter image distance LA, thereby matching the reciprocating range of the moving screen, from A to B. The varifocal mirror also changes the size of the panel image. When the varifocal mirror becomes a convex mirror, the panel image 1501X appears smaller than the actual panel. When the varifocal mirror becomes a concave mirror, the panel image 1501V appears larger than the actual size. However, this magnification change can be compensated by the change of object distance. For the fixed lens 1502, object at X is projected to position B with a larger magnification because the object distance XL is shorter; while object at V is projected to position A with a smaller magnification because the object distance VL is longer. As a result, the magnification change induced by the varifocal mirror can be reduced or cancelled by properly matching the magnification change to the object distance change, which is also induced by the varifocal mirror.

Figure 9A:
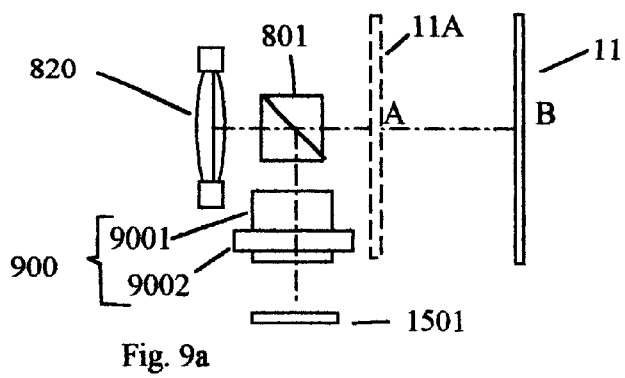
FIG. 9a illustrates an exemplary embodiment of the zooming optics based on a combination of a varifocal mirror and a moving projection lens.
Figure 9B:
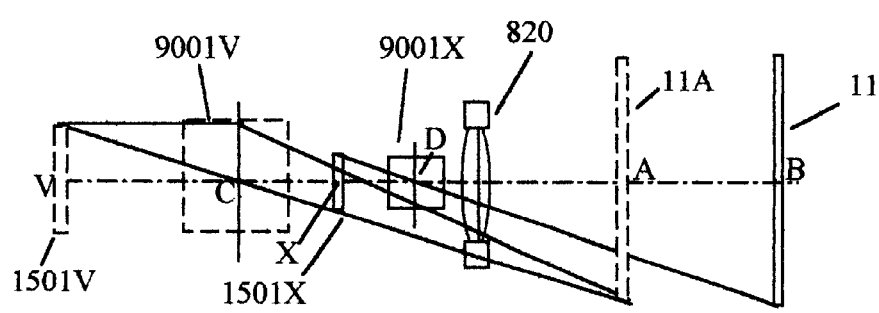

(3) Zooming by a combination of moving optical elements and changing the power of optical elements: FIG. 9a illustrates an exemplary embodiment comprising a varifocal mirror 820 and a moving projection lens system 900. A TIR prism 801 directs the projection beam from the projection lens to the varifocal mirror and then sends the reflection beam from the varifocal mirror to the screen 11. The projection lens system comprises an actuator mechanism 9002 that can vary the object distance, measured from the image panel 1501 to the lens 9001. FIG. 9b illustrates the positions and the sizes of the virtual images of the image panel and the projection lens as imaged by the varifocal mirror in the setup of FIG. 9a. When the varifocal mirror is in its convex mirror mode, the images of the lens 9001X and the panel 1501X appear smaller than the actual sizes. The image on the panel is projected to the screen 11 at location B. When the varifocal mirror is in its concave mirror mode, the images of the lens 9001V and the panel 1501V appear larger than the actual sizes. By adjusting the object distance between the lens 9001V and the image panel 1501V, the images on the image panel can be projected to a location A with a desired size, which can be selected to match the image size at B so that the display space has rectangular sides.

All of the above reciprocating image delivery mechanisms maintain both the focus and the magnification of the projected images as the screen moves. When desired, an image delivery mechanism can synchronize only the focus of the projection to the moving screen, regardless of the changing magnification. The display space will have trapezoidal sides, instead of rectangular sides, due to the variation of magnification. But the mechanism can thus be simplified. Such an image delivery mechanism can be built into the image projector to become a "synchronized-focusing projector", which synchronizes image focusing with respect to screen motion. A synchronized-focusing projector can be constructed by at least the following two methods:

(1) Focusing by moving one projection optical element: This method includes moving the optical element with respect to the image source (so that object distance is changed) and moving with respect to other optical elements in the projection optics (so that the power of the optics assembly is changed). It also includes moving the reflected image of the targeted optical elements by moving a reflector, instead of moving the optical element itself.

(2) Focusing by changing the power of one optical element: Again, there can be three types of varifocal optical elements: deformable lens, deformable concave mirror, and varifocal mirror, as described in previous sections. These varifocal elements can be used to relay the image on the image source to a projection optics so that the effective object distance or the compound optical power can be changed as the varifocal element changes its power. They can also be used as the projection optics so that they can change the image distance directly.

When an image projector has a large depth of focus, even the synchronized-focusing is not needed. Such a "deep focus projector" can project the image frames to a moving screen without obvious de-focusing in the projected images.

In the Rotating Approach, two improved image delivery mechanisms can be used. The first mechanism comprises a multi-mirror replay reflector rotating at half the speed of the rotating screen and a system of second relay reflectors rotating in synchronization with the screen, both with proper positioning with respect to the screen's angular position. Preferably, the rotating multi-mirror should also reciprocate to keep the optical path length constant. The optical path length is measured from the image projector, to the reflecting surfaces on the multi-mirror block, and then to the rotating screen. The parent invention of this current application discloses a translating mechanism for this purpose. If the axis of the rotating multi-mirror does not reciprocate, then the optical path length varies periodically as the multi-mirror rotates. Instead of reciprocating the rotating multi-mirror, a reciprocating image delivery mechanism, as described previously in the Reciprocating Approach, can be applied to accommodate the changing optical path length. That is, a reciprocating image delivery mechanism can be combined with a rotating multi-mirror to become an improved rotating image delivery mechanism.

Figure 10:
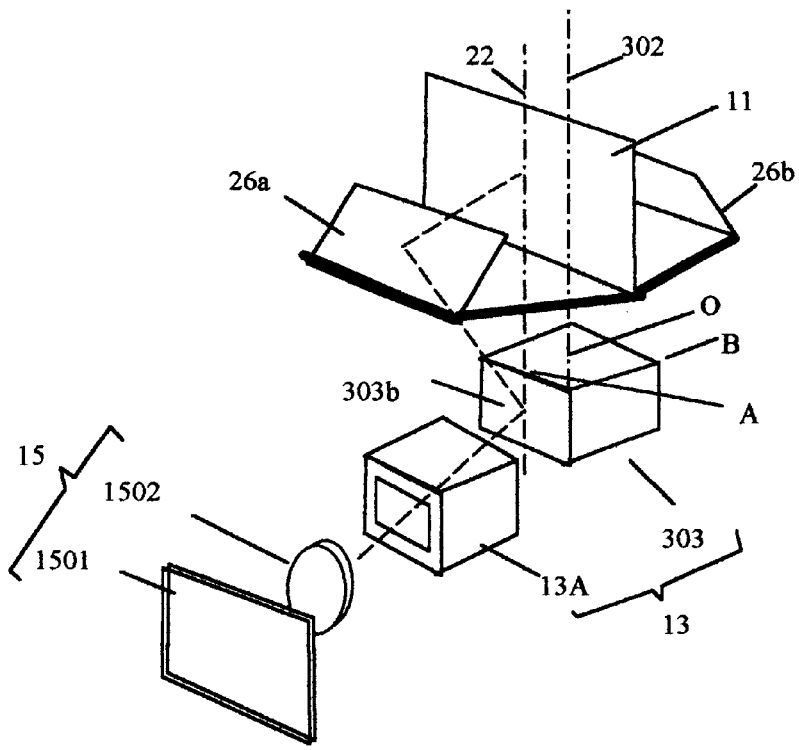
FIG. 10 illustrates the combination of a multi-mirror reflector and a reciprocating image delivery mechanism for the rotating screen approach.

In the first method, a reciprocating image delivery mechanism based on moving reflectors can be placed between the image projector and the rotating multi-mirror, as shown in FIG. 10. In this embodiment, the screen revolves about axis 22 and the multi-mirror block 303 revolves about axis 302. The distance between these two axes OA is fixed and can be selected to be equal to the distance from one of the reflective surface, e.g. 303b, to the center axis 302. The maximum change of optical path length resulted from the rotation of the multi-mirror block is therefore OB–OA, where point B sits at one corner of the multi-mirror block. For every ¼ revolution of the multi-mirror, the reciprocating reflector system 13A reciprocates one cycle with a stroke of ½ (OB–OA) so that the change of optical path length is compensated.

In the second method, a reciprocating image delivery mechanism based on zooming optics can be applied. As described previously in the Reciprocating Approach, these zooming optics are generally built into part of the image projector system. This integrated system can therefore be called a "synchronized-zooming projector", as the zooming action of the projector is synchronized with the reciprocating screen motion. The synchronized-zooming projector can therefore also be used as the image projector in the rotating approach with the rotating multimirror. Again, for every ¼ revolution of the multi-mirror, the zooming function reciprocates one cycle to accommodate the change of optical path length.

The above two methods maintain both the focus and the magnification of the projected images as the screen rotates. When desired, a "synchronized-focusing projector", as described previously in the Reciprocating Approach, can also be used with the multi-mirror mechanism to synchronize only the focus of the projection to the moving screen.

The motion synchronization between the reciprocating image delivery mechanism and the rotating multi-mirror can be achieved by using a system of gears and timing belts, or by using electronically controlled motors with synchronized driving signals.

When an image projector has a large depth of focus, even the synchronized focusing is not needed. Such a "deep focus projector"can project the image frames to the rotating screen without obvious defocusing, regardless of the change of optical path length caused by the rotating multi-mirror.

Figure 11:
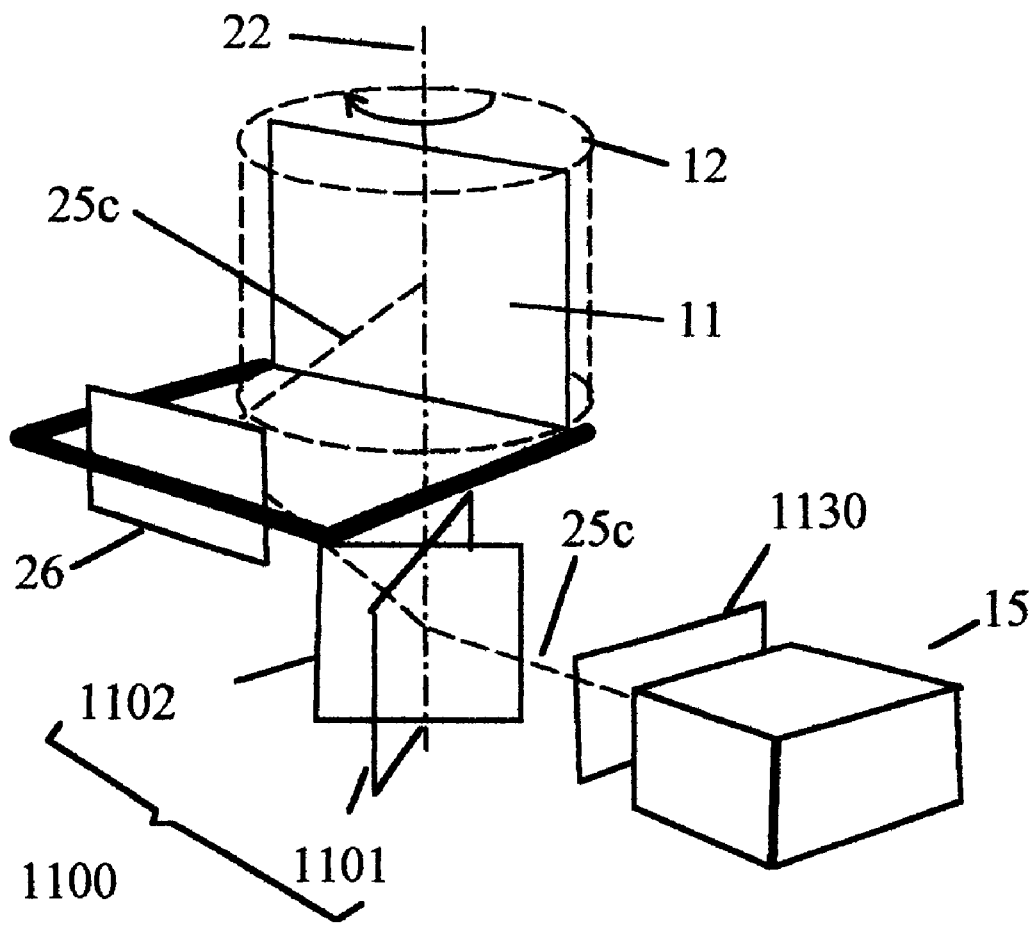
FIG. 11 illustrates the rotating reflector mechanism based on the orthogonal switchable reflectors.

The second improved mechanism is an orthogonal switchable reflector system comprising two switchable reflectors arranged at 90 degree. The system rotates at a speed of ½ of the speed of the rotating screen and is properly positioned with respect to the screen's angular position. Each of the switchable reflectors can be switched to become reflective or transmissive. FIG. 11 illustrates a preferred embodiment. The reflector system 1100 revolves about the same axis 22 as the rotating screen does. The axis 22 passes through the surface of each of the two reflectors 1101 and 1102. Since the two reflectors are arranged at an angle of 90 degree, they function in a similar fashion as the two adjacent reflecting surfaces in the multi-mirror reflector do—alternatingly reflecting the projection beam to the rotating screen and making both volume sweeps in one screen revolution capable of receiving complete projection. Each of the two reflectors can be selected to become reflective or transmissive. When one reflector is in reflection mode, the other is in transmission mode so that it does not block the projection beam. As illustrated in FIG. 11, when reflector 1102 is positioned to send the projection beam 25c to the screen through reflector 26, it is selected to reflection mode; and reflector 1101 is selected to transmission mode so that the projection beam can pass through it.

The switchable reflector can be an electrically switchable mirror based on liquid crystal (LC) cells. One typical construction is to sandwich one chiral cell between two π-cells. The chiral cell has it LC molecules ordered as left-handed helices when the projector beam is right circularly polarized; or the chiral cell can be ordered as right-handed helices when the projector beam is left circularly polarized. The two π-cells switch the handedness of the incident light, from either side of the cells assembly, that is then either reflected or transmitted by the chiral cell. A description of the device principle can be found in [Buzak 1985]. The switching sequence is synchronized to the rotation of the orthogonal switchable reflector system. A slip-ring system can be used to transmit control signal to the π-cells. A circular polarizer 1130, such as another chiral cell or a combination of a linear polarizer with a ¼ wave plate, is used to convert the projection beam into a circularly polarized beam.

The foregoing discussion should be understood as illustrative and should not be considered to be limiting in any sense. While this invention has been particularly shown and described with reference to certain embodiments thereof, it will be understood that these embodiments are shown by way of example only. Those skilled in the art will appreciate that various changes in form and details may be made therein without departing from the spirit and scope of the invention as defined by the following claims and their equivalents.

REFERENCES

De Montebello, R. L. "Three-dimensional Optical Display Apparatus", U.S. Pat. No. 3,462,213, Aug. 18, 1969

Buzak, T. S. "A Field-sequential Discrete-depth-plane Three-dimensional Display", SID International Symposium, vol. 16, pp. 345, 1985

Downing, E. et al. "A Three-Color, Solid-State, Three-dimensional Display", Science vol. 273, 30 August 1996, pp. 1185

Hattori, T. et al. "Spatial Modulation Display using Spatial Light Modulators", Optical Engineering, vol. 31, No. 2 pp. 350, 1992

Korevaar, E. J. "Three Dimensional Display Apparatus", U.S. Pat. No. 4,881,068, 1989

Morton, R. R. "Three Dimnsional Display System", U.S. Pat. No. 4,922,336, May 1, 1990

Paek E. G. et al. "A 3D Projection Display using PDLCs", presented at the Conference of the International Society for Optical Engineering, Jan. 29–Feb. 2, 1996, San Jose, Calif.

Rawson, E. G. "Vibrating Varifocal Mirrors for 3-D Imaging", IEEE Spectrum, September, 1969, pp. 37

Sadovnik, Lev. S. and Rizkin, A. "3-D volume visualization display", U.S. Pat. No. 5,764,317, Jun. 9, 1998

Thompson, E. E. and DeMond, T.W. "Apparatus and Method for Image Projection", U.S. Pat. No. 5,506,597, Apr. 9, 1996

(Note: Documents with Bold characters are to be attached to this application with the Information Disclosure Statement)

What is claimed is:

1. A method for displaying volumetric 3D images comprising the steps of:
   (1) displaying in sequence a set of 2D image frames on an image generating panel;
   (2) reciprocating a display plane rapidly and thereby defining a display space; and
   (3) projecting in sequence said 2D image frames, through a varifocal optical means, onto said display plane; said varifocal optical means maintaining the projected image on the reciprocating display plane in focus.

2. A method of claim 1 wherein the projection through said varifocal optical means including the step of changing the optical power of at least one deformable lens or deformable curved mirror in coordination with the position of said display plane.

3. A method of claim 2, further including the steps of
   (1) projecting the 2D image frames through at least one additional deformable lens or deformable curved mirror; and
   (2) changing the optical power of the additional deformable lens or deformable curved mirror to maintain the magnification of the projected image frames on the reciprocating display plane invariant.

4. A method of claim 2, further including the step of projecting the 2D image frames through at least one additional varifocal mirror to maintain the magnification of the projected 2D image frames on the reciprocating display plane invariant.

5. A method of claim 1 wherein the projection through said varifocal optical means including the step of changing the optical power of at least one varifocal mirror in coordination with the position of said display plane.

6. A method of claim 5, further including the step of maintaining the magnification of the projected image frames on the reciprocating display plane invariant.

7. A method of claim 1, further including the step of changing the distance among the optical elements used in the varifocal optical means in coordination with the position of said display plane.

8. A method of claim 1 wherein the step of reciprocating a display plane including the step of sweeping a projection screen in unidirectional motion or rotating a projection screen to create an oscillating motion.

9. A method of claim 1 wherein the step of reciprocating a display plane including the step of reciprocating a planar light beam intersecting a photoluminescent media.

10. An apparatus for displaying volumetric 3D images comprising
    (1) an image projector;
    (2) a screen mounted on a slider-crankshaft-wheel system, or on a rotating flat surface, or on a rotating endless belt system, or on a rotating helical surface, or on a rotating spiral wheel surface.
    (3) an image delivery mechanism; said image delivery mechanism comprising a reciprocating reflector system, or a moving condenser system, or a moving zoom lens system.

11. An apparatus for displaying volumetric 3D images comprising
    (1) an image projector;
    (2) an image display space;
    (3) an image delivery mechanism comprising a reciprocating reflector system; the reciprocating reflector system comprising a slider-crankshaft-wheel mechanism, or a mechanism of rotating arms, or a rotating endless belt mechanism, or a rotating helical surface, or a rotating spiral wheel surface.

12. An apparatus of claim 11 wherein said reciprocating reflector system comprising a pair of reflectors having a relative angle of 90 degree.

13. An apparatus of claim 11 wherein said reciprocating reflector system comprising a single reflector.

14. An apparatus of claim 13, further comprising an optical means folding the optical path of the projection beam projected by the image projector; said optical means comprising a set of prisms or a polarization beam splitter with a quarter wave retarder.

15. An apparatus of claim 11 wherein said image display space comprising a space swept by a reciprocating screen.

16. An apparatus of claim 15 wherein the screen being mounted on a slider-crankshaft-wheel mechanism, or on a rotating flat surface, or on a mechanism of rotating arms, or on a rotating endless belt mechanism, or on a rotating helical surface, or on a rotating spiral wheel surface.

17. An apparatus of claim 11 wherein said image display space comprising a space of photoluminescent media swept by a planar light beam.

18. An apparatus for displaying volumetric 3D images comprising
    (1) an image generating panel;
    (2) a reciprocating screen;
    (3) a varifocal projection optics.

19. An apparatus of claim 18 wherein said varifocal projection optics comprising at least two deformable lens or deformable curved mirrors.

20. An apparatus of claim 18 wherein said varifocal projection optics comprising at least one deformable lens or deformable curved mirror and at least one varifocal mirror.

21. An apparatus of claim 18 wherein said varifocal projection optics comprising at least one varifocal mirror.

22. An apparatus of claim 18, further comprising means of changing the optical distance among the optical elements used in the varifocal projection optics in coordination with the position of said reciprocating screen.

23. An apparatus of claim 22 wherein the optical distance changing means comprising a moving reflector.

24. An apparatus of claim 18 wherein said image generating panel comprising a panel of light-emitting diodes, or a ferroelectric liquid crystal display panel, or a digital micromirror device.

25. A method for displaying volumetric 3D images comprising the steps of:
    (1) displaying in sequence a set of 2D image frames on an image generating panel;
    (2) revolving a display plane rapidly about a first axis and thereby defining a display space;
    (3) revolving a multi-mirror reflector about a second axis at a speed ½ of the revolving speed of said display plane;
    (4) projecting in sequence said 2D image frames, first through a projection path compensating means, then by way of the reflection of the multi-mirror, onto said display plane; said projection path compensating means including one of the following two means:
       a. passing the image beam from the image panel first through a projection lens and then through the reflection of a reciprocating reflectors system; said reciprocating reflectors system reciprocating in coordination with the angular position of the rotating multi-mirror; or b. projecting the image beam from the image panel using a zooming optics and changing the optical power of said zooming optics in coordination with the angular position of the rotating multi-mirror.

26. A method of claim 25 wherein said reciprocating reflectors system comprising a single reflector or a pair of reflectors having a relative angle of 90 degree.

27. A method of claim 25 wherein said zooming optics comprising a moving zoom lens or a projection optics having at least one deformable lens, or deformable curved mirror, or varifocal mirror.

28. A method of claim 25 wherein the step of revolving a display plane including the step of revolving a planar light beam intersecting a photoluminescent media.

29. A method for displaying volumetric 3D images comprising the steps of:
  (1) displaying in sequence a set of 2D image frames on an image generating panel;
  (2) revolving a display plane rapidly and thereby defining a display space;
  (3) revolving an orthogonal switchable reflector system at a speed ½ of the revolving speed of said display plane; said orthogonal switchable reflector system comprising two switchable reflectors arranged in orthogonal positions; said switchable reflectors capable of being switched between a transparent state and a reflective state;
  (4) switching the states of the two swichable reflectors in coordination with the angular position of the orthogonal switchable reflector system;
  (5) projecting said 2D image frames, through reflection of said orthogonal switchable reflector system, onto said display plane.

30. A method of claim 29 wherein the switchable reflector being an electrically switchable mirror based on a liquid crystal cell.

31. A method of claim 29 wherein the step of revolving a display plane including the step of revolving a planar light beam intersecting a photoluminescent media.

* * * * *